United States Patent [19]

Nakayama et al.

[11] Patent Number: 4,603,338

[45] Date of Patent: Jul. 29, 1986

[54] INK DOT PRINTER

[75] Inventors: Tetsuro Nakayama, Shizuoka; Tsutomu Kimura, deceased, late of Shizuoka, both of Japan, by Shizuko Kimura, Youko Kimura, Tsuyoshi Kimura, heirs

[73] Assignee: Tokyo Electric Co., Ltd., Tokyo, Japan

[21] Appl. No.: 665,131

[22] Filed: Oct. 26, 1984

[30] Foreign Application Priority Data

Oct. 26, 1983 [JP] Japan ................................ 58-200462

[51] Int. Cl.$^4$ .......................... G01D 15/16; B41J 3/12

[52] U.S. Cl. ................................. 346/140 R; 400/124

[58] Field of Search .......................... 346/140; 400/124

[56] References Cited

U.S. PATENT DOCUMENTS

| | | | |
|---|---|---|---|
| 3,334,354 | 8/1967 | Mutschler | 346/140 |
| 4,047,185 | 9/1977 | Phillips | 346/140 |
| 4,362,407 | 12/1982 | Kolm | 400/124 |
| 4,383,265 | 5/1983 | Kohashi | 346/140 |
| 4,552,469 | 11/1985 | Tsuge | 400/124 X |

FOREIGN PATENT DOCUMENTS

| | | |
|---|---|---|
| 128558 | 12/1984 | European Pat. Off. . |
| 56-95682 | 3/1981 | Japan . |

OTHER PUBLICATIONS

Mitchell et al.; Inkon Demand Printing . . . ; IBM-TDB, vol. 18, No. 2, Jul. 1975, pp. 608-609.

*Primary Examiner*—Joseph W. Hartary
*Attorney, Agent, or Firm*—Oblon, Fisher, Spivak, McClelland & Maier

[57] ABSTRACT

The present invention provides an ink dot printer wherein an electrostatic field is produced between ends of needles and an electrode, and the needles are selectively actuated to cause ink sticking to the ends of the needles to fly with a Coulomb force thereby to form dots with ink thus flown on record paper which covers the electrode without contacting the needles with the record paper. By this construction, noises are signficantly reduced and the ends of the needles are not damaged while printing results of a high resolution can be obtained. In addition, a tapered configuration of the ends of the needles will facilitate separation of the ink from the needles, assuring the uniformity of dots in shape and size. In case a positive voltage is applied to the electrode while the needles are grounded, treatment for insulation can be performed easily, allowing production of printing heads with ease and at a reduced cost. Besides, in case a bimorph is employed for a driving source for a needle, production of noises at the driving sources can be eliminated.

6 Claims, 18 Drawing Figures

FIG.6(a)
FIG.6(b)
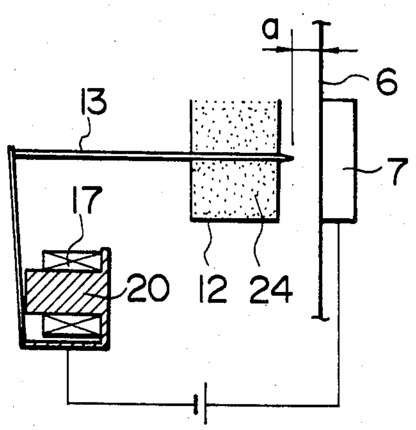
FIG.7 (a)
FIG.7 (b)
FIG.7 (c)
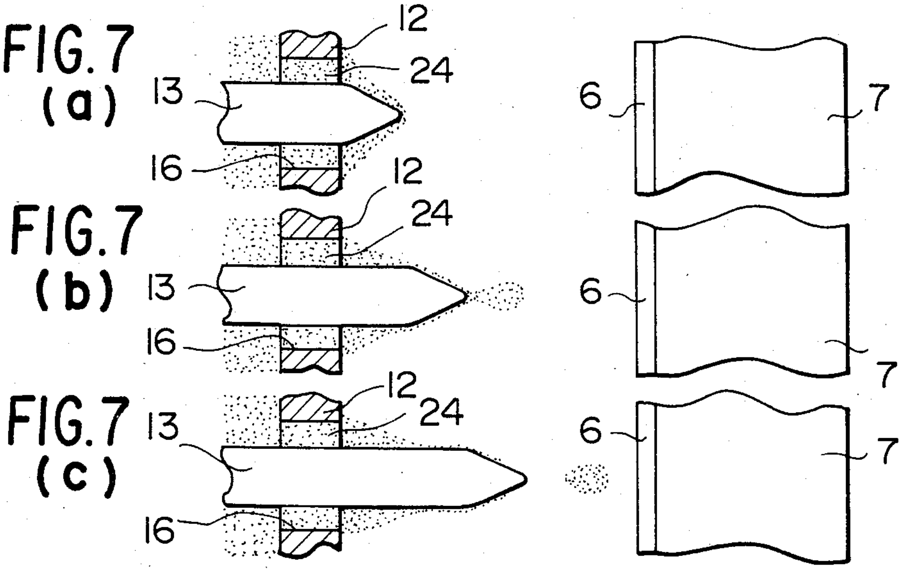

INK DOT PRINTER

FIELD OF THE INVENTION

This invention relates to an ink dot printer wherein ink applied to ends of a plurality of needles is selectively flown to form dots of ink in order to print a character and so on with a combination of such ink dots.

OBJECT OF THE INVENTION

It is a first object of the present invention to make use of an electrostatic force for printing without any contact of ends of needles with record paper.

It is a second object of the invention to allow ink dots to be flown with a low energy.

It is a third object of the invention to facilitate treatment for insulation of needles.

It is a fourth object of the invention to reduce actuating noises.

It is a fifth object of the invention to make use of magnetic ink to improve supply of ink to ends of needles.

BRIEF DESCRIPTION OF THE DRAWINGS

FIGS. 6(*a*) and 6(*b*) are side elevational views illustrating actuation of a needle;

FIGS. 7(*a*), 7(*b*) and 7(*c*) are plan views of an end portion of a needle showing an ink drop being flown;

TECHNICAL BACKGROUND OF THE INVENTION AND PROBLEMS

Figure 1:
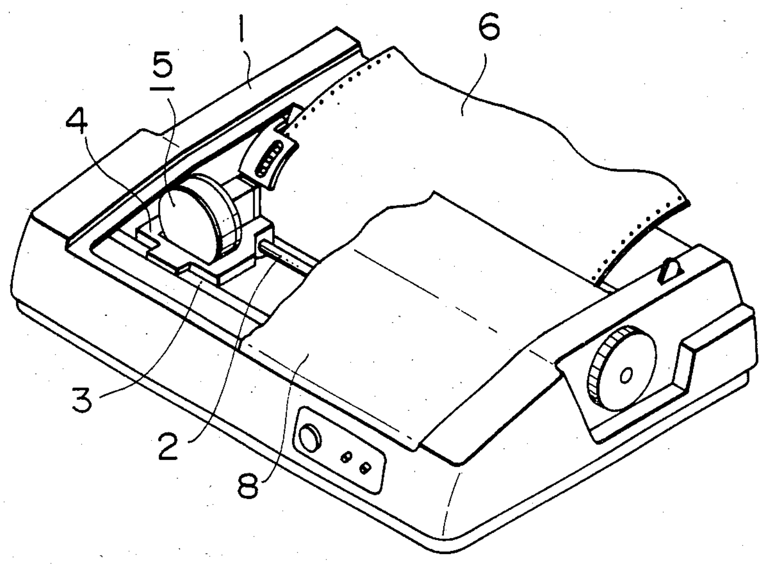
FIG. 1 is a perspective view, partly broken, illustrating a first embodiment of the present invention.
Figure 2:
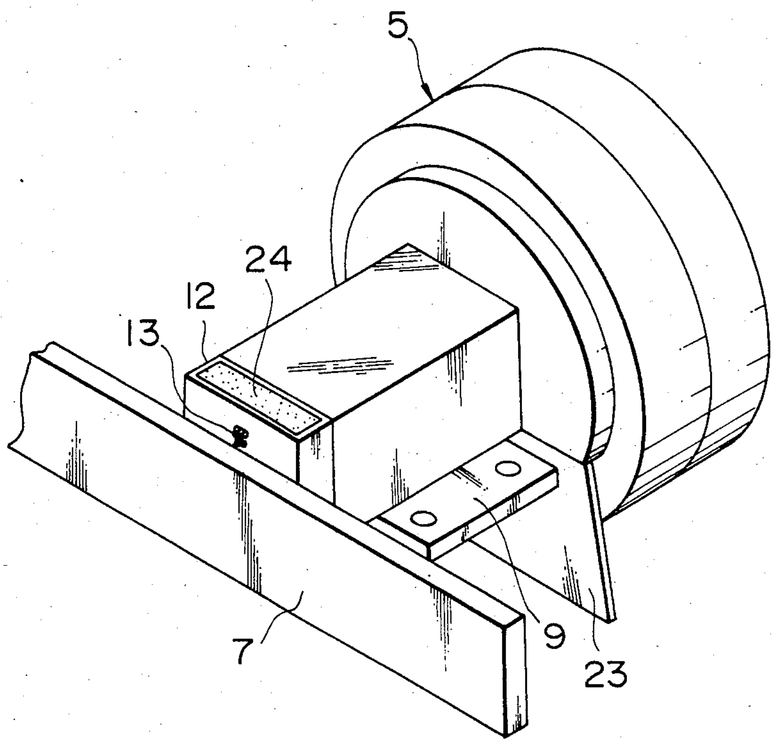
FIG. 2 is a perspective view of a printing head and an electrode.
Figure 3:
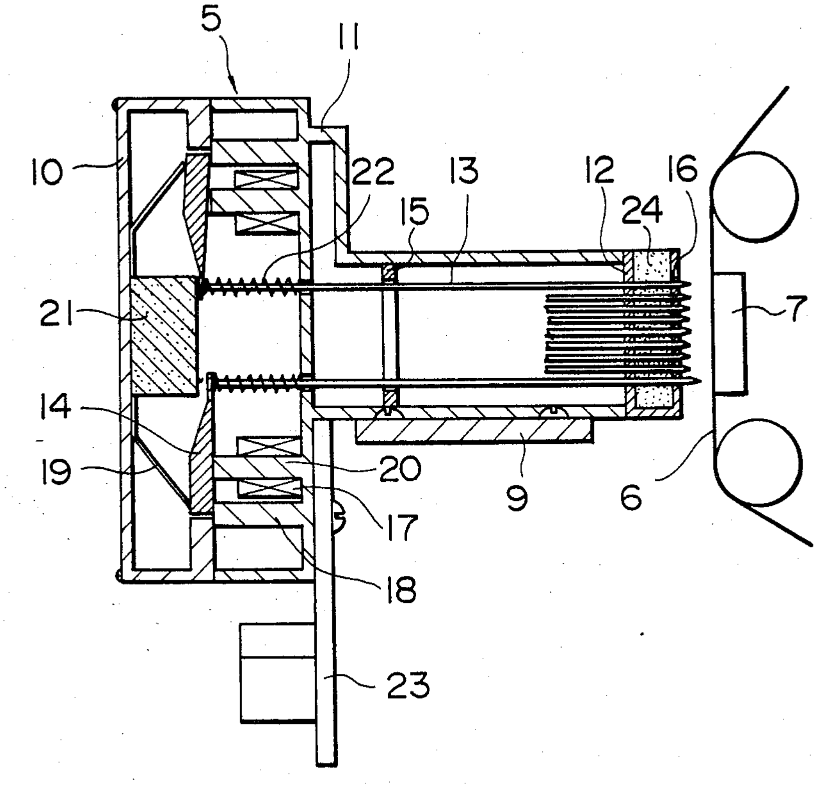
FIG. 3 is a vertical sectional side elevational view of the printing head and the electrode.

In a conventional dot printer, a plurality of needles are selectively actuated to impact either directly upon pressure sensitive paper wrapped around a platen or indirectly via an ink ribbon upon ordinary paper. However, such a conventional dot printer which may be of either type has a defect that very high noises are resulted from impact sounds of needles at an instant of impact.

Thus, recently a system has been proposed wherein a pair of magnetic poles are located in opposing relationship to each other on opposite sides of ends of a plurality of needles and are partially dipped in magnetic ink so as to attract magnetic ink with a magnetic force to form a layer of the magnetic ink between the two magnetic poles whereby the ends of the needles are contacted with record paper to effect printing. This system has some effect for reduction of noises since a pressure for printing to record paper is relatively low. However, in this system, noises are still produced since needles are directly contacted with record paper, and besides ends of needles may possibly suffer damage such as abrasion or bending. Accordingly, due to the face that the diameter of needles cannot be made very small in order to keep a predetermined strength, there is a limit to increase of density of dots, resulting in difficulty to draw characters, figures and so on of a high resolution.

EMBODIMENTS OF THE INVENTION

A first embodiment of the present invention will be described with reference to FIGS. 1 to 9. A carrier shaft 2 and a guide shaft 3 are provided within a housing 1 and support a carrier 4 for sliding movement thereon. A printing head 5 is secured to the carrier 4. An electrode 7 is located in opposing relationship to the printing head 5 via record paper 6. A cover 8, not entirely shown, for covering the print head 5 and so on is located on the top of the housing 1.

Now, description will be given of the printing head 5. The printing head 5 is mounted on the carrier 4 by way of a head mounting member 9 and has a casing including a rear cover 10, a guide section 11 and an ink tank 12. A plurality of needles 13, an actuating mechanism for the needles 13, and so on, are held in the housing of the printing head 5.

A gap between ends of the needles 13 and the electrode 7 is adjusted to be from 0.5 to 1.5 mm, and preferably to 1.0 mm, for a non-printing condition and from 0.2 to 0.8 mm, and preferably to 0.5 mm, for a printing condition.

Figure 8:
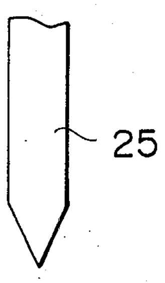
FIGS. 8(*a*), 8(*b*) and 8(*c*) are plan views illustrating different shapes of an end of a needle.
Figure 8:
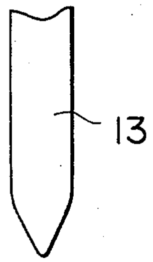
Figure 8:
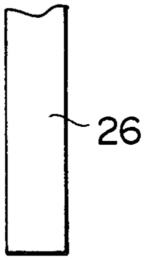

The needles 13 have rearward ends securely fixed to annularly arranged armatures 14 and intermediate portions guided by a needle guide 15 while forward end portions thereof extend through needle holes 16 formed in the ink tank 12. The forward ends of the needles 13 are tapered forwardly as seen in FIG. 8(*b*).

The actuating mechanism for actuating the needles 13 includes the armatures 14, exciting coils 17 and other members provided within the printing head 5. In particular, each of the armatures 14 is held between a yoke 18 and a holding spring 19 for pivotal motion between an iron core 20 of the exciting coil 17 and a stopper element 21. Accordingly, pivotal motion of the armature 14 will cause a reciprocating motion of the needle 13, and hence associated members or elements are located and dimensioned to allow the needle 13 to reciprocate within an appropriate range from an appropriate position. A needle spring 22 surrounds and extends along a rear end portion of the needle 13 and constantly exerts a force to press the armature 14 against the stopper element 21. Further, the printing head 5 has mounted thereon a head power supply pw plate 23 for delivering an electric current to the exciting coils 17.

Figure 4:
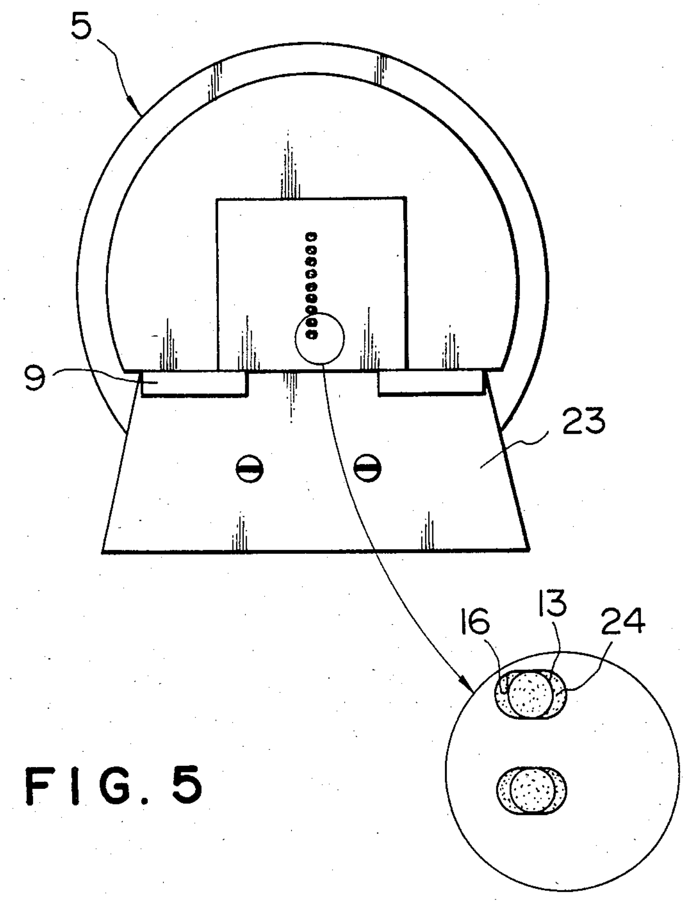
FIG. 4 is a front elevational view of the printing head and the electrode.
Figure 5:
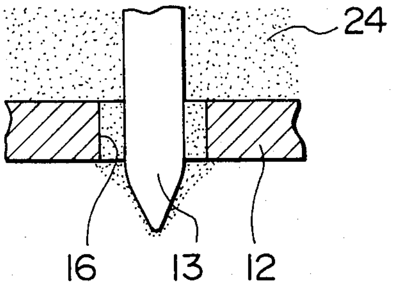
FIG. 5 is a transverse sectional view of a needle hole.

The needle hole 16 formed in the ink tank 12 has a horizontally elongated elliptical shape as shown in FIG. 4 and is dimensioned such that ink 24 is held to stick to an end of the needle 13 by a suitable surface tension as illustrated in FIG. 5. The ink 24 may be oil ink which has a viscosity of lower than 20 cp, a surface tension of 10 to 30 dyne/cm, preferably of 25 dyne/cm, and a specific resistance of $10^6$ to $10^{11}$ Ω·cm, and preferably of $10^8$ Ω·cm.

Upon printing, a voltage of plus 1500 to 2500 volts, and preferably of 1800 to 2000 volts, is applied to the electrode 7 while needle 13 side elements including the armatures 14 and so on are are grounded. In order that spark discharge may not appear between the electrode 7 and the ends of the needles 13, the opposing electrode 7 is provided with insulation treatment.

With this construction, dots are formed without contact of the needles 13 with the record paper 6. In particular, between the electrode 7 and the end of each of the needles 13, an electrostatic field is produced by a voltage applied therebetween, and hence the ink 24 sticking to the end of the needle 13 is subject to a Coulomb force to pull the ink 24 towards the electrode 7. Thus, when the needle 13 is moved from a normal position providing a distance a from the end of the needle 13 to the record paper 6 to a printing position providing a different distance b, the ink 24 flies as seen in FIGS. 6(*a*) and 6(*b*) and FIGS. 7(*a*), 7(*b*) and 7(*c*). In other words, in the position providing the distance a, the force to stick the ink 24 to the needle 13 is greater than the Coulomb force to pull the ink 24 to the electrode 7, and hence the ink 24 is held sticking to the needle 13. On the other hand, in the position providing the distance b, the Coulomb force is greater than the holding force, and hence the ink 24 sticking to the needle 13 is caused to fly towards the electrode 7. The ink 24 thus flown is transferred to the record paper 6 covering the electrode 7 to form a dot. In this way, the needles 13 are selectively actuated to effect printing of a character, a figure or the like with a combination of dots thus formed.

Meanwhile, such movement of the needle 13 as described above is produced by pivotal movement of the armature 14. In particular, the head power supply pw plate 23 selectively energizes the exciting coils 17 to attract the armatures 14 thereto, resulting in movement of the corresponding needles 13. Then, when the exciting coils 17 are deenergized, the armatures 14 are returned to their respective initial positions by the associated needle springs 23.

Figure 9:
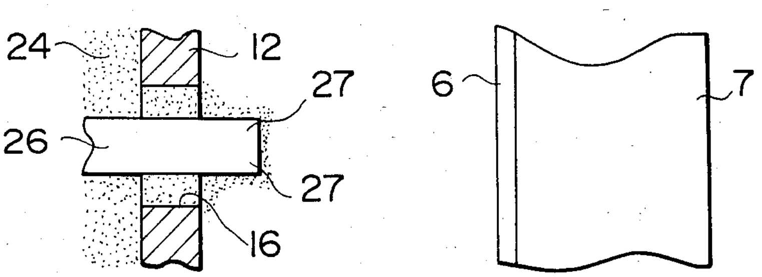
FIGS. 9(*a*) and (*b*) are a plan view of an end portion of a needle illustrating an ink drop being flown when a needle having a flat end is used.
Figure 9:
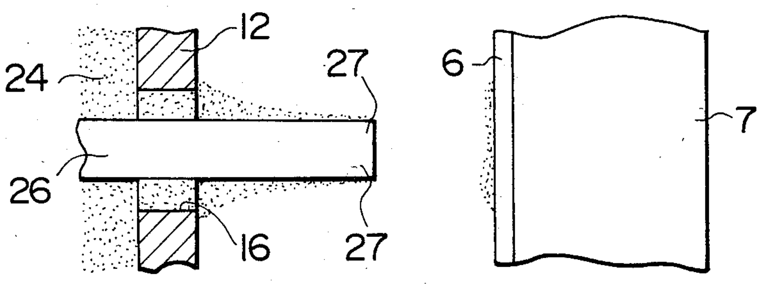

In the meantime, while the end of each needle 13 of the embodiment is tapered toward its extremity, the extremity thereof may be pointed such as of a needle 25 shown in FIG. 8(*a*). Such a tapered configuration is provided in order to hold the uniformity of dots in shape, size and the like. In particular, a tapered end toward an extremity will allow concentration of electrostatic charges thereto, and hence the holding force to the ink 24 will be reduced, resulting in ready separation and also in stabilization of the flying direction of the ink 24. Accordingly, the quantity, direction and so on of the flying ink 24 is stabilized, and hence the uniformity of dots is maintained. On the contrary, in case of a needle having no tapered end such as a needle 26 shown in FIG. 8(*c*), electrostatic charges are concentrated to edge portions 27 of the needle 26 as illustrated in FIGS. 9(*a*) and 9(*b*), and hence ink will be concentrated to the edge portions 27. Thus, it is difficult to maintain the uniformity of dots.

Again, upon printing, a plus voltage is applied to the electrode 7 while the needles 13 are grounded. The reason will be described now. In particular, the exciting coils 17 for reciprocating the the needles 13 are disposed adjacent the needles 13 in the printing head 5. A voltage signal of a low voltage (about 12 volts) is applied to the exciting coils 17 to actuate the armatures 14 to reciprocate the needles 13. Now, if a high voltage (about 1.8 kV) is applied to the needles 13, then a very high potential difference will appear between the needles 13 and the exciting coils 17 and armatures 14 which are located very near to the needles 13. Thus, in order to compensate for such a high potential difference, new and special insulation must be provided. Such provision of insulation is difficult within the printing head 5 which is crowded with such active elements. Besides, with regard to safety, if insulation is not provided perfectly between the needles and a head body, it will cause the possibility of an electric shock and hence is dangerous. In addition, introduction of a high voltage to the needles 13 is also difficult since the head body moves rightwardly and leftwardly across the machine, and hence it is also necessary to take a new countermeasure therefor.

From this reason, the needles 13 are grounded, thereby attaining the assurance of a drive signal voltage to the actuating exciting coils 17, the safety of the head, and the simplification of the head.

Figure 10A:
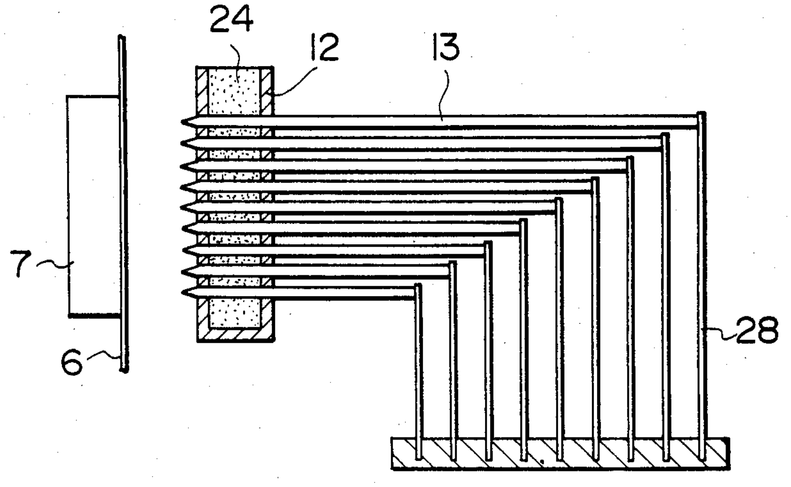
FIGS. 10(*a*) and 10(*b*) are side elevational views illustrating a second embodiment of the invention in which a bimorph is used for a driving source for a needle.
Figure 10B:
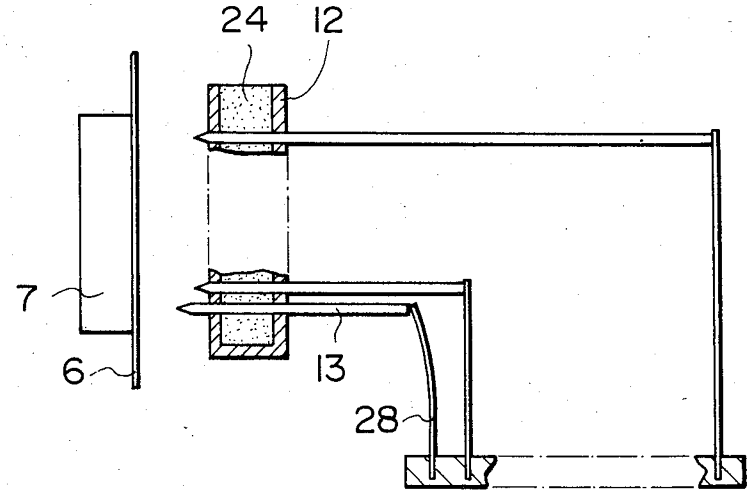

A second embodiment of the present invention will now be described with reference to FIG. 10. In FIG. 10, like parts or elements are designated by like reference numerals to those of the first embodiment (this also applies to a following third embodiment). This embodiment employs a bimorph 28 for a driving source of a needle 13. In particular, the bimorph 28 is fixed to a rear end of the needle 13 such that deformation of the bimorph 28 will drive the needle 13 to effect reciprocating movement. By this arrangement, no noise will be caused by the driving source for the needle 13, allowing attainment of a printer which produces a very low noise. It is to be noted here that the bimorph 28 is a member in the form of a plate obtained by putting two plate elements one on the other and integrating the same with each other and has a character that it is curved in different directions depending upon the polarity of voltages applied to the elements, that is, depending upon the polarity of voltages applied, the bimorph 28 is deformed such that one of the elements is elongated while the other is contracted.

Figure 11:
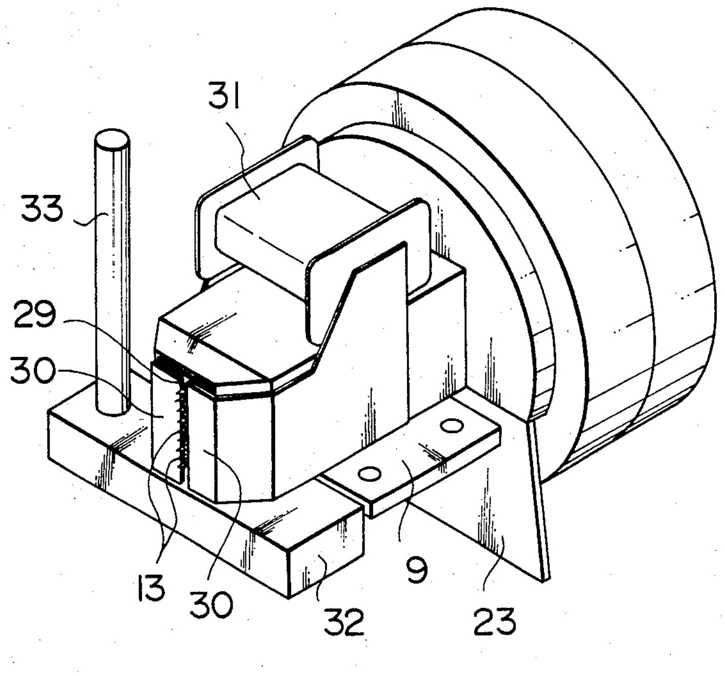
FIG. 11 is a perspective view of a printing head illustrating a third embodiment of the invention.

A third embodiment of the present invention will be described below with reference to FIG. 11. In this embodiment, a pair of magnetic plates 30 are located in opposing relationship to each other to define therebetween a slit 29 in which ends of needles 13 are located. The magnetic plates 30 are coupled to opposite poles of a magnetic ink attracting coil 31. Lower ends of the magnetic plates 30 extend into a magnetic ink tank 32 and are thus dipped in magnetic ink (not shown) contained in the magnetic ink tank 32. It is to be noted that a cartridge 33 containing magnetic ink therein is removably mounted on the magnetic ink tank 32, and when magnetic ink within the magnetic ink tank 32 is used up, then magnetic ink can be supplemented only by exchanging the cartridge for another new cartridge. In this arrangement, if the magnetic ink attracting coil 31 is energized, magnetic fluxes are produced between the magnetic plates 30 extending into the magnetic ink tank 32 so that magnetic ink is attracted up into the slit 29. Accordingly, magnetic ink can be sticked to ends of the needles 13.

What is claimed is:

1. An ink dot printer comprising:

a plurality of needles held in a first position relative to a medium to be printed;

magnetic means for selectively moving individual ones of said needles to a second position closer to said medium than said first position;

means for applying ink to ends of said needles;

an electrode positioned in opposition to all of said needles and on a side of said medium opposite said needles; and means for producing an electric field between said electrode and said needles, said electric field being sufficiently strong to cause said ink on selected ones of said needles in said second positon to fly toward said medium.

2. The ink dot printer of claim 1 including:

a pair of magnetic poles positioned to form a slit therebetween, said needles passing through said slit;

a magnetic ink reservoir into which portions of said magnetic poles extend; and an electric coil to which said poles are connected for magnetizing said poles, whereby ink from said reservoir is drawn into said slit for application to said needles.

3. The apparatus of claim 1 including means for grounding said needles.

4. The apparatus of claim 3 wherein said means for producing an electric field include means for applying a positive potential to said electrode.

5. An ink dot printer according to claim 1, wherein said ends of each of said needles is tapered toward its extremity.

6. An ink dot printer according to claim 1, wherein said means for selectively moving comprises a bimorph.

* * * * *